(12) United States Patent
Philpot et al.

(10) Patent No.: US 9,533,444 B2
(45) Date of Patent: Jan. 3, 2017

(54) METHOD FOR CREATING FURNITURE COMPONENTS FROM COMPOSITES

(71) Applicants: Randall J. Philpot, West Valley City, UT (US); Dane R. Philpot, West Valley City, UT (US)

(72) Inventors: Randall J. Philpot, West Valley City, UT (US); Dane R. Philpot, West Valley City, UT (US)

( * ) Notice: Subject to any disclaimer, the term of this patent is extended or adjusted under 35 U.S.C. 154(b) by 0 days.

(21) Appl. No.: 14/594,976

(22) Filed: Jan. 12, 2015

(65) Prior Publication Data
US 2015/0290870 A1    Oct. 15, 2015

Related U.S. Application Data

(60) Provisional application No. 61/977,557, filed on Apr. 9, 2014.

(51) Int. Cl.
| | |
|---|---|
| *B29C 53/80* | (2006.01) |
| *B29C 53/56* | (2006.01) |
| *B29C 70/08* | (2006.01) |
| *A47B 96/20* | (2006.01) |
| *B29C 70/32* | (2006.01) |
| *B29C 70/54* | (2006.01) |
| *B29L 31/44* | (2006.01) |
| *B29K 307/04* | (2006.01) |
| *B29K 309/08* | (2006.01) |
| *A47B 13/00* | (2006.01) |

(52) U.S. Cl.
CPC ........... *B29C 53/564* (2013.01); *A47B 96/206* (2013.01); *B29C 53/8091* (2013.01); *B29C 70/081* (2013.01); *B29C 70/326* (2013.01); *B29C 70/545* (2013.01); *A47B 2013/006* (2013.01); *A47B 2200/0021* (2013.01); *B29K 2307/04* (2013.01); *B29K 2309/08* (2013.01); *B29L 2031/44* (2013.01); *B29L 2031/448* (2013.01); *Y10T 29/481* (2015.01)

(58) Field of Classification Search
CPC .................. A47B 2013/006; A47B 2200/002; A47B 2200/0021; Y10T 29/481; Y10T 29/49801; B68G 7/00; C22C 47/06; B29C 53/8091; B29C 53/564; B29C 66/41
See application file for complete search history.

(56) References Cited

U.S. PATENT DOCUMENTS

2007/0187348 A1*  8/2007  Malekmadani .... A47B 87/0223
                                                            211/186

OTHER PUBLICATIONS

KennaMetal, Composite Machining Guide, Jun. 26, 2013.*

* cited by examiner

*Primary Examiner* — Jermie Cozart
(74) *Attorney, Agent, or Firm* — Michael F. Krieger; Kirton McConkie

(57) ABSTRACT

Filament winding or another technique can be used to create composite parts having various layers of pigmented fibers. The composite parts can then be milled to form one or more flat surfaces on the composite part. Due to the layering of pigmented fibers, the flat surfaces can have a pattern that resembles wood grain or another pattern. These milled composite parts can then be used as components for furniture or other items.

7 Claims, 9 Drawing Sheets

METHOD FOR CREATING FURNITURE COMPONENTS FROM COMPOSITES

CROSS-REFERENCE TO RELATED APPLICATIONS

This application claims priority to U.S. Provisional Patent Application No. 61/977,557 filed Apr. 9, 2014 with the same inventors and is hereby incorporated by reference.

BACKGROUND

Filament winding is a process in which fiber rovings (e.g. bundles of carbon fiber, fiberglass, aramids, etc.) are wound on a mandrel. In some systems, the fiber rovings are pulled from large spools through a resinous polymeric material, such as epoxy, and then wound upon the mandrel. In other systems, the fiber rovings are pre-impregnated with the resinous polymeric material rather than being pulled through the resinous polymeric material. Typically, the mandrel is held in a filament winding machine and, while the mandrel is spun, a carriage containing the fiber spools and resin matrix travels back and forth down the length of the mandrel to form layers of composite material along the mandrel. Various types of mandrels exist including collapsible, inflatable, dissolvable, meltable, flexible, and rigid mandrels. Once wound on the mandrel, the composite material is cured and ultimately removed from the mandrel as a wound composite part. The manner in which the wound composite part is removed from the mandrel will depend on the specific type of mandrel used. This wound composite part can then be further processed as desired to form the end product. Other processes for forming composite parts also exist.

BRIEF SUMMARY

The present invention extends to a process of creating furniture components from composites and to the furniture components created from this process. Various different processes can be used to create the composites including filament winding, roll wrapping, pultrusion, cloth wrapping, fiber placement, or other methods for placing/wrapping/winding fiber reinforcing on (or in) a mandrel, form, or mold(s).

When filament winding is employed, for example, various layers of pigmented fibers can be wound on a cylindrical mandrel to produce a composite part. The composite part can then be milled to form one or more flat surfaces on the composite part (e.g. to form a rectangular shape). Due to the layering of pigmented fibers, the flat surfaces can have a pattern that resembles wood grain. These milled composite parts can then be used as components for furniture or other items.

Alternatively, the fibers can be wound on a multi-sided mandrel (e.g. a triangular, square, or rectangular mandrel) to form a multi-sided composite part. Then the composite part can be milled into a rounded shape. Due to the layering of pigmented fibers, the rounded (e.g. cylindrical) shape can have a pattern that resembles wood grain. Round or multi-sided composite parts can also be formed using other processes and then milled to create a desired wood grain pattern.

In one embodiment, the present invention is implemented as a method for producing a component using filament winding. Pigmented fibers are filament wound on a mandrel to create a composite part having various layers of pigmented fibers. The composite part is then milled to form one or more flat surfaces on the composite part. Each flat surface exposes a plurality of the layers of pigmented fibers such that a pattern is visible on the flat surface.

In another embodiment, the present invention comprises a furniture component. The furniture component is a composite part having various layers of pigmented fibers formed using filament winding. The furniture component also includes at least one flat surface. Each flat surface exposes a plurality of the layers of pigmented fibers such that a pattern is visible on the flat surface.

In another embodiment, the present invention comprises a piece of furniture. The piece of furniture comprises a plurality of furniture components. At least one of the furniture components comprises a composite part having various layers of pigmented fibers formed using filament winding. The at least one furniture component also includes at least one flat surface. Each flat surface exposes a plurality of the layers of pigmented fibers such that a pattern is visible on the flat surface.

In another embodiment, the present invention is implemented as a method for forming a composite part having a wood grain pattern. A composite part having various layers of pigmented fibers is created. The composite part is then milled to expose a plurality of the layers on a surface of the composite part thereby creating a wood grain pattern on the surface.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1A:
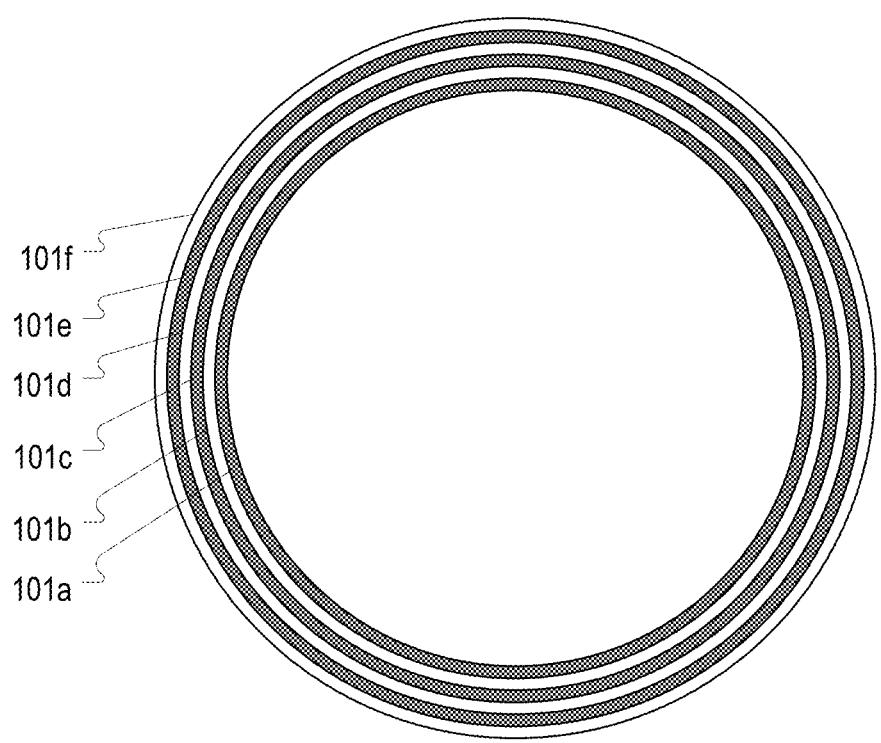
FIG. 1A is a cross-sectional view of a cylindrically-shaped composite part formed using filament winding. Multiple pigmented (or colored) fibers are used in the filament winding process so that the composite part has various layers as indicated by the alternating light and dark sections.

The present invention extends to a process of creating furniture components from composites and to the furniture components created from this process. Various different processes can be used to create the composites including filament winding, roll wrapping, pultrusion, cloth wrapping, fiber placement, or other methods for placing/wrapping/winding fiber reinforcing on (or in) a mandrel, form, or mold(s).

When filament winding is employed, for example, various layers of pigmented fibers can be wound on a cylindrical mandrel to produce a composite part. The composite part can then be milled to form one or more flat surfaces on the composite part (e.g. to form a rectangular shape). Due to the layering of pigmented fibers, the flat surfaces can have a pattern that resembles wood grain. These milled composite parts can then be used as components for furniture or other items.

Alternatively, the fibers can be wound on a multi-sided mandrel (e.g. a triangular, square, or rectangular mandrel) to form a multi-sided composite part. Then the composite part can be milled into a rounded shape. Due to the layering of pigmented fibers, the rounded (e.g. cylindrical) shape can have a pattern that resembles wood grain. Round or multi-sided composite parts can also be formed using other processes and then milled to create a desired wood grain pattern.

In one embodiment, the present invention is implemented as a method for producing a component using filament winding. Pigmented fibers are filament wound on a mandrel to create a composite part having various layers of pigmented fibers. The composite part is then milled to form one or more flat surfaces on the composite part. Each flat surface exposes a plurality of the layers of pigmented fibers such that a pattern is visible on the flat surface.

In another embodiment, the present invention comprises a furniture component. The furniture component is a composite part having various layers of pigmented fibers formed using filament winding. The furniture component also includes at least one flat surface. Each flat surface exposes a plurality of the layers of pigmented fibers such that a pattern is visible on the flat surface.

In another embodiment, the present invention comprises a piece of furniture. The piece of furniture comprises a plurality of furniture components. At least one of the furniture components comprises a composite part having various layers of pigmented fibers formed using filament winding. The at least one furniture component also includes at least one flat surface. Each flat surface exposes a plurality of the layers of pigmented fibers such that a pattern is visible on the flat surface.

In another embodiment, the present invention is implemented as a method for forming a composite part having a wood grain pattern. A composite part having various layers of pigmented fibers is created. The composite part is then milled to expose a plurality of the layers on a surface of the composite part thereby creating a wood grain pattern on the surface.

In this specification, a "composite part" is to be understood as any part formed of fiber composite materials whether the fibers are long (continuous), short (non-continuous), particulate, etc. Composite materials are materials made up of more than one dissimilar (e.g. distinct) material. Milling is used to refer to any type of working of a composite part that removes a portion of the composite part. For example, milling in this specification can include planning, cutting, slicing, grinding, sanding, etc.

FIG. 1A illustrates a cross-sectional end view of a generalized example of a composite part 100 formed using a filament winding process in which multiple pigmented fibers are employed. As stated in the background, filament winding consists of winding fibers around a mandrel until a desired thickness of wound fibers is achieved. By employing multiple differently pigmented fibers, various layers of different colors can be formed within the composite part produced using the filament winding process.

For ease of illustration, the layers 101a-101f of composite part 100 are depicted as circular rings. However, the thickness and position (both radial and longitudinal) of any layer can be accurately controlled using the filament winding process. In other words, the carriage containing the fiber spools can be accurately controlled to ensure that the fibers are positioned in the appropriate location to enable the formation of a desired pattern as will be further described below. In some embodiments, software can be used to accurately control the carriage and other components of a filament winding machine to ensure that the fiber orientation and wall thickness within the composite part are precise. This precision can be employed to achieve a desired pattern once the composite part is milled as further described below.

In the following description, the formation of a wood grain pattern will be primarily described. The reference to a wood grain pattern does not necessarily mean that the pattern appears identical to wood grain, but that it resembles wood grain. Additionally, many other types of patterns can also be formed that may not appear similar to wood grain. Accordingly, the present invention should not be limited to any particular pattern, but encompasses many different patterns that may be formed using the techniques and processes described herein.

For example, many different patterns can be created by using software or other control circuitry to control the placement of fibers with accuracy to ensure that a desired pattern will be formed once the composite part is milled. Additionally, in some embodiments, intermediate grinding or milling operations can be performed during formation of the composite part (e.g. in between winding and curing of a layer) to control the thickness of each layer or portion of a layer accurately to ensure that a desired pattern can ultimately be achieved.

In a particular example, a mandrel between approximately 1 and 1.5 inches in diameter can be used for winding alternating layers of pigmented glass and carbon fiber. Because carbon fiber is typically a gray or black color, it may be desirable to form thicker layers of glass pigmented with a desired color separated by thinner layers of carbon fiber. By forming thicker layers of the pigmented glass, the color of the glass will dominate in the pattern formed once a flat surface is milled as will be further described below.

In this specification, a pigmented fiber should be construed as any fiber having a color whether or not the fiber's natural color is modified in any way. Accordingly, the reference to multiple pigmented fibers implies that multiple fibers of different colors (or of another visible feature such as texture) are used to form the composite part. Also, in some embodiments, only a single type of fiber may be used. In such cases, the texture of the fiber or variations in the color of the fiber may provide a desired appearance once the composite part is milled.

The pigment, color, or other visible feature of a fiber can be determined based on a type of material of which the fiber is made (e.g. glass or carbon), a type of coating applied to the fibers (e.g. electroplating carbon fiber with a nickel coating), a type or color of the resin used (i.e. the resin can dye or otherwise change the appearance of the fiber), a process used to cure the resin (e.g. removing all or some of the air bubbles in the resin), etc. Accordingly, a pigmented fiber should be construed broadly to include not only the appearance of the fiber prior to winding/curing, but also the appearance of the fiber after the composite part has been formed and/or milled.

Figure 1B:
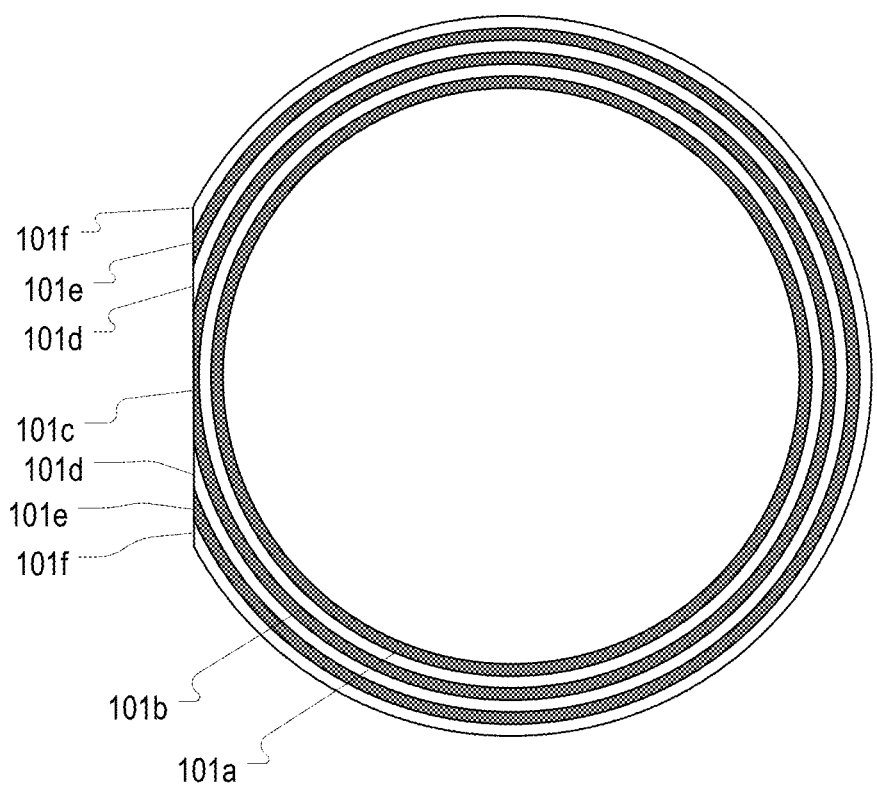
FIG. 1B illustrates the composite part of FIG. 1A after the exterior surface of the composite part has been milled to form a flat surface.

To create a patterned surface, composite part 100 can be milled to form at least one flat surface as is shown in FIG. 1B. By milling a flat surface on composite part 100, multiple layers of the pigmented fibers are exposed thereby forming a pattern that may resemble wood grain. Of course, other patterns could be formed by positioning the layers appropriately.

Figure 1C:
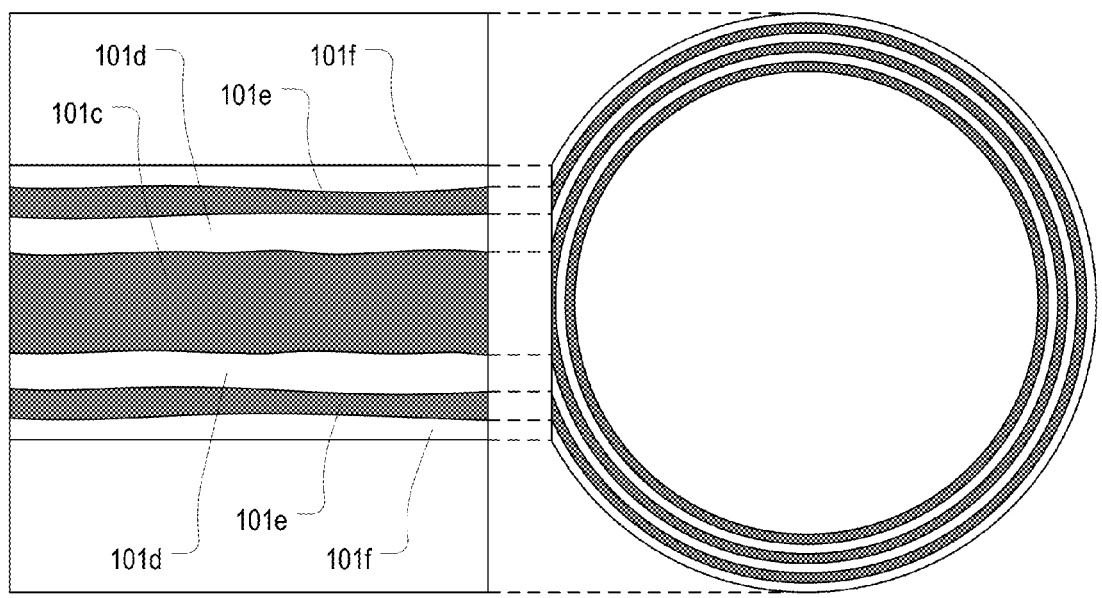
FIG. 1C illustrates a front view of the flat surface formed on the composite part depicted in FIG. 1B. The flat surface reveals multiple layers of the composite part so that the flat surface has a pattern that resembles the grain of wood.

As shown in FIG. 1B, the flat surface extends into layer 101c such that layers 101c-101f are exposed. FIG. 1C provides a front view of composite part 100 illustrating the pattern formed on the flat surface. Because the winding can be performed in a way that causes the radial position of a layer to vary along the length of the composite part, when a flat surface is formed, the resulting pattern can have the appearance of wood grain. Other patterns can also be formed by positioning the layers appropriately.

Figure 2A:
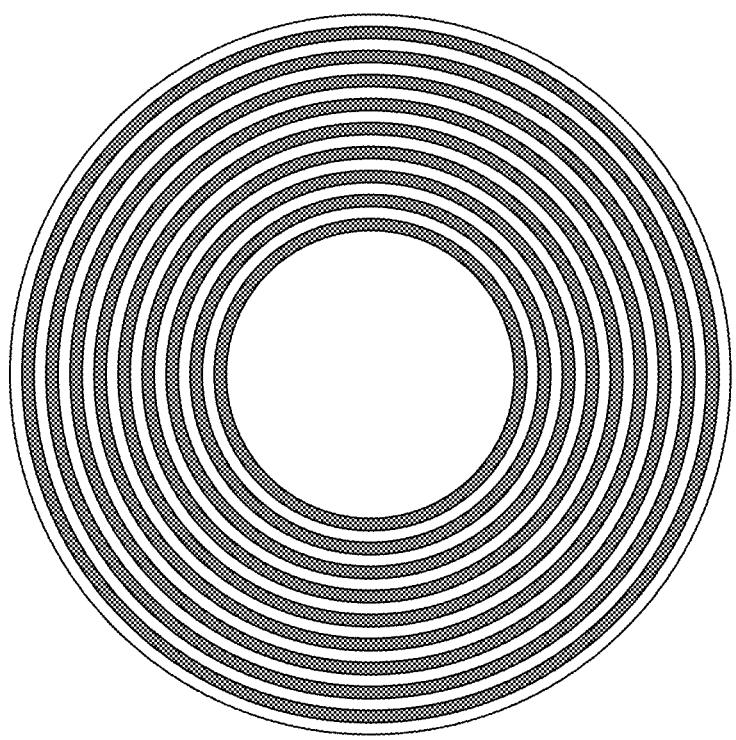
FIG. 2A illustrates a cross-sectional view of another cylindrically-shaped composite part that was also formed using filament winding to create multiple layers of pigmented fibers.
Figure 2B:
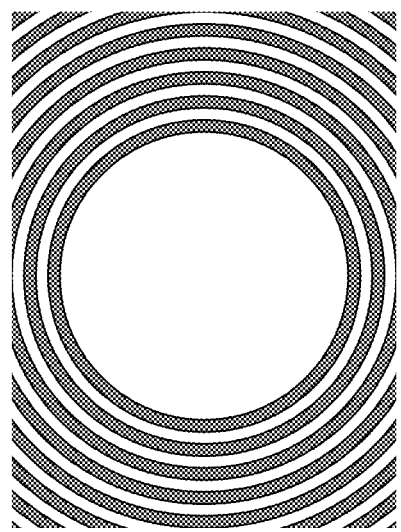
FIG. 2B illustrates the composite part of FIG. 2A after the composite part has been milled into a rectangular shape.
Figure 2C:
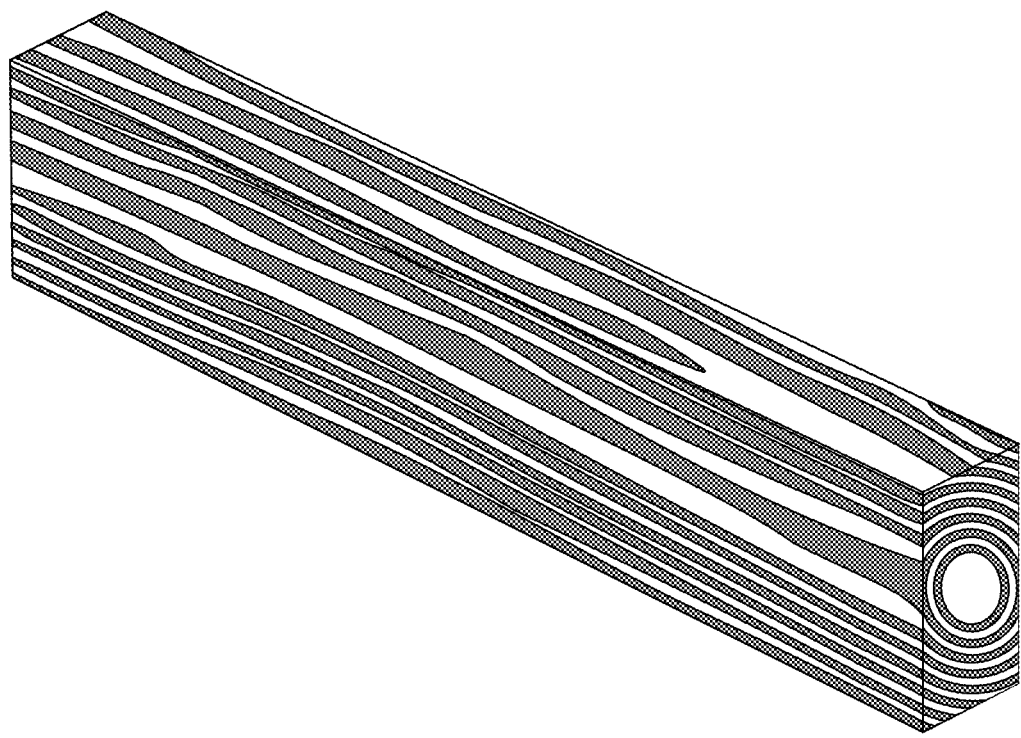
FIG. 2C illustrates a perspective view of the composite part of FIG. 2B. Each flat surface reveals multiple layers of the pigmented fibers thereby providing a wood-grain pattern on the exterior surfaces of the composite part.

FIGS. 2A-2C illustrate another example composite part 200. FIG. 2A illustrates a cross-sectional view of a composite part 200 after the filament winding process. FIG. 2B then illustrates a cross-sectional view of composite part 200 after it has been milled into a rectangular shape. Finally, FIG. 2C illustrates a perspective view of composite part 200. As shown, the exterior surfaces of composite part 200 have a wood grain pattern due to the various layers that are exposed when the cylindrical surfaces are milled flat.

Although the two above examples illustrate a composite part that is formed using a round (e.g. having a cylindrical or round cross section) mandrel, other shaped mandrels could also be used (e.g. an oval-shaped mandrel). In short, any shaped mandrel could be used as long as the resulting composite part has layers that are positioned such that a flat surface can be milled that is not parallel to the layers (i.e. so that the flat surface exposes multiple layers).

Any number of flat surfaces can be formed on a composite part including flat surfaces that extend at an angle other than 90 degrees from another flat surface. For example, a composite part can be milled into a triangular shape or hexagonal shape or can have a beveled edge. Also, a flat surface can extend into the composite part (e.g. to form a rabbet or channel). In each of these cases, the flat surface can expose multiple layers to create a pattern on the surface.

In this specification, a flat surface does not need to be perfectly flat. For example, a flat surface may have a slight curve as long as the curve does not match the curve of the layers (i.e. as long as the slightly curved surface still reveals multiple layers). Accordingly, a flat surface should be construed as any substantially flat surface milled into a composite part that reveals multiple layers of the wound fibers.

Although the above description provides an example of forming a round composite part and then milling flat surfaces to expose a wood grain pattern, a similar process can be used to form rounded surfaces with wood grain patterns. For example, if the mandrel is multi-sided (e.g. triangular or rectangular), a wood grain pattern can be formed by milling the resulting multi-sided composite part into a rounded shape. The rounded shape would expose various layers of the pigmented fibers thereby providing the wood grain pattern.

Further, although the above description is directed to using a filament winding process, other processes can be employed to create composites that are milled to have a wood grain pattern. For example, using a roll wrapping technique, a resin pre-impregnated composite fiber cloth can be wrapped around a mandrel (whether round or multi-sided) or placed on a form or in a mold, and then cured. The resulting composite part can be milled as described above to create a wood grain pattern. Similarly, using the pultrusion technique, a mixture of resin and fibers can be pulled through a heated die which cures the mixture into a composite part that can be milled to have a wood grain pattern. Regardless of the particular process employed to create the composite part, the position of the various layers of the pigmented fibers within the composite part can be controlled so that a wood grain pattern is created once the composite part is milled.

Figure 3:
FIGS. 3-5 each illustrate an embodiment of a table having legs that are composite parts formed in accordance with the present invention.
Figure 4:
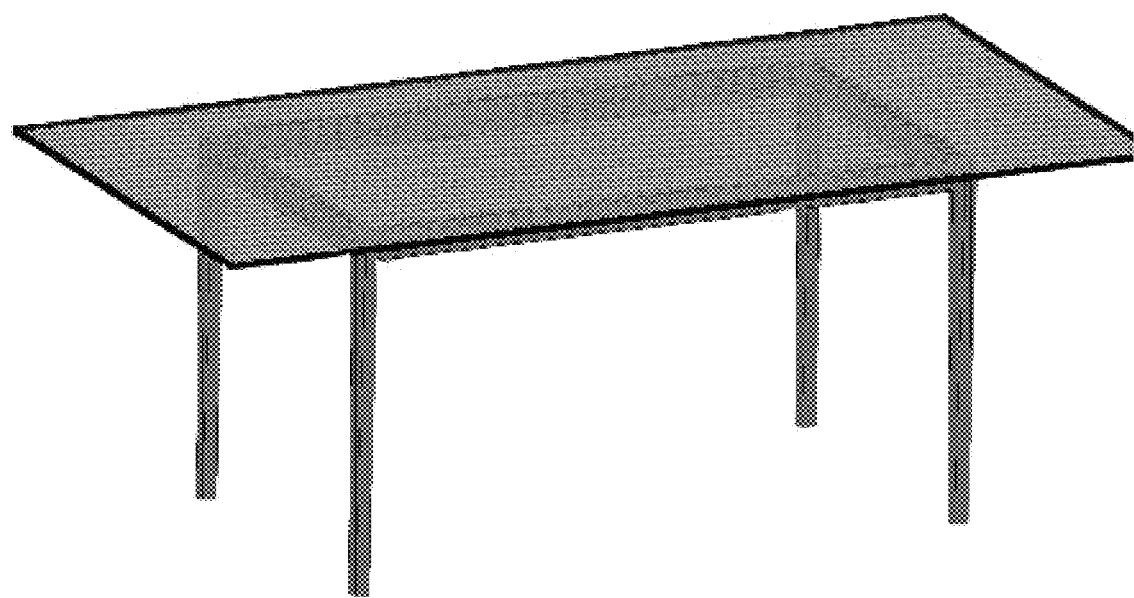
Figure 5:
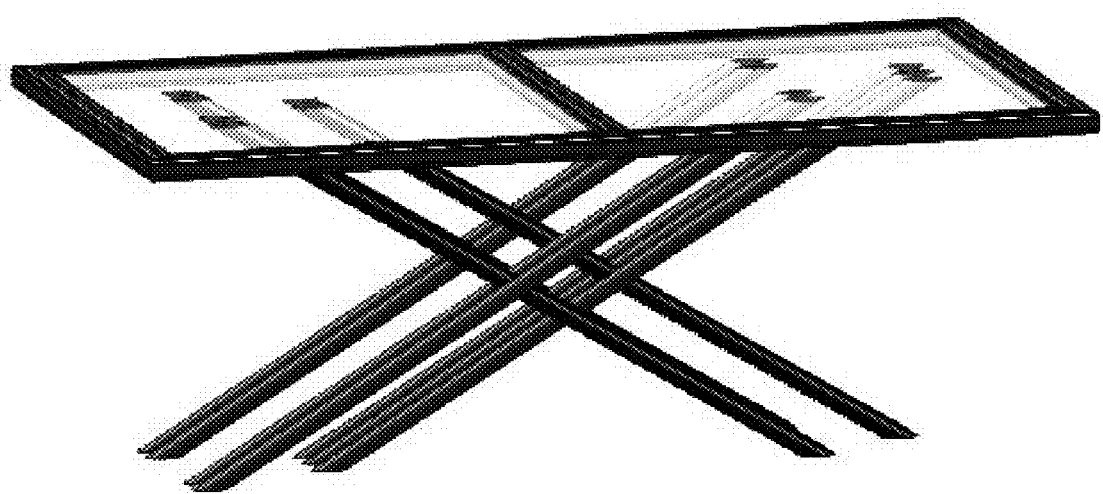

FIGS. 3-5 each illustrate an example of a table (300, 400, and 500 respectively) that can be constructed using composite parts formed as described above. In each example, composite parts that have been milled into rectangular shapes to expose the multi-layer pattern are used for the legs of the table. Legs of other shapes could also be employed. A glass or other transparent table top can be employed to allow the surfaces of the composite parts to remain visible. In tables 300 and 500, the table top frame is also constructed of composite parts formed using the techniques of the present invention.

In table 400, the table top consists of two layers of tempered glass (or other transparent material such as polycarbonate or PMMA) with an aluminum honeycomb core bond in between. Other types of honeycomb material could also be used including nomex, glass, carbon, phenolic, thermoplastic, etc. The table tops of tables 300 and 500 are the same with the exception that the glass of the table top in table 500 is bonded to the legs. The rails of table 500 may also be bonded/fastened to the glass. The legs of table 500 are notched to allow them to be overlapped and connected together in the criss-cross pattern.

In some embodiments, the edges of the table top may be sealed by placing or bonding composite parts to the edges. These composite parts can be formed in a manner described above and can be flat or radiused. These composite parts can therefore give the table top a sealed and decorative finish.

In some embodiments, a table top may also be formed of composites. In some embodiments, a composite table top may not have a wood grain or other pattern as described above. However, in other embodiments, a composite table top with a wood grain or other pattern could be created by laminating together a plurality of composite sheets or sections of various widths and sizes. For example, multiple layers of different color composites can be built up such that when a flat surface is milled, a pattern is formed.

In some embodiments, a composite table top can be formed of thin outer sections (e.g. top and bottom sections) with a light weight core section sandwiched in between to reduce the weight (and cost) of the table top and possibly increase the strength and/or stiffness of the table top.

In addition to tables, many other types of furniture or structures can be built using composite parts with patterns formed as described above. For example, a frame (e.g. a picture frame) can be formed by milling four appropriately sized composite parts into an appropriate shape and then combining the shaped parts. Chairs or stools could be formed in a similar manner as tables. Walls (e.g. portable or modular walls), panels, or other enclosures can be formed using composite parts formed as described above as support structures and a flat sheet (whether formed of composites or of another material) as an outer surface. Accordingly, composite parts having a pattern formed in accordance with the present invention can be employed in many different types of furniture or other structures.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for producing a component using filament winding, the method comprising:
   filament winding pigmented fibers on a mandrel to create a composite part having various layers of pigmented fibers; and
   milling the composite part to form one or more planar surfaces on the composite part, each planar surface exposing a plurality of the layers of pigmented fibers, the layers being oriented to the planar surface so that no layer is parallel nor perpendicular to the planar surface such that a pattern is created on the flat surface by milling and thereby exposing portions of the layers.

2. The method of claim 1, wherein the pigmented fibers comprise carbon fiber and glass fiber.

3. The method of claim 2, wherein at least some of the layers are thicker than other layers.

4. The method of claim 1, wherein milling the composite part to form one or more planar surfaces comprises milling a cylindrical composite part into a rectangular composite part.

5. The method of claim 1, wherein the component is a furniture component.

6. The method of claim 5, wherein the furniture component is a leg of a table.

7. The method of claim 5, wherein the furniture component is a frame for a table top.

* * * * *